(12) United States Patent
de Goede

(10) Patent No.: US 9,098,431 B2
(45) Date of Patent: Aug. 4, 2015

(54) USB REDIRECTION FOR INTERRUPT TRANSACTIONS

(75) Inventor: Hans de Goede, Delft (NL)

(73) Assignee: Red Hat, Inc., Raleigh, NC (US)

( * ) Notice: Subject to any disclaimer, the term of this patent is extended or adjusted under 35 U.S.C. 154(b) by 197 days.

(21) Appl. No.: 13/303,298

(22) Filed: Nov. 23, 2011

(65) Prior Publication Data

US 2013/0132618 A1  May 23, 2013

(51) Int. Cl.
*G06F 3/00* (2006.01)
*G06F 13/10* (2006.01)
*G06F 13/26* (2006.01)
*G06F 13/24* (2006.01)
*G06F 9/48* (2006.01)

(52) U.S. Cl.
CPC .............. *G06F 13/105* (2013.01); *G06F 13/24* (2013.01); *G06F 13/26* (2013.01); *G06F 9/4812* (2013.01)

(58) Field of Classification Search
None
See application file for complete search history.

(56) References Cited

U.S. PATENT DOCUMENTS

| 6,047,351 | A | * | 4/2000 | Cheng | 710/266 |
| 6,721,322 | B1 | * | 4/2004 | Lakhani et al. | 370/395.1 |
| 8,121,035 | B2 | * | 2/2012 | Oh et al. | 370/235 |
| 8,850,090 | B2 | * | 9/2014 | de Goede | 710/53 |
| 2005/0220115 | A1 | * | 10/2005 | Romano et al. | 370/395.4 |
| 2006/0253673 | A1 | * | 11/2006 | Lee et al. | 711/163 |
| 2009/0049220 | A1 | * | 2/2009 | Conti et al. | 710/267 |
| 2010/0223616 | A1 | * | 9/2010 | De et al. | 718/100 |
| 2011/0022769 | A1 | * | 1/2011 | Hung et al. | 710/313 |
| 2011/0126195 | A1 | * | 5/2011 | Tsirkin | 718/1 |
| 2012/0304175 | A1 | * | 11/2012 | Damola et al. | 718/1 |
| 2013/0332926 | A1 | * | 12/2013 | Jakoljevic et al. | 718/1 |

* cited by examiner

*Primary Examiner* — Ilwoo Park
*Assistant Examiner* — Aurangzeb Hassan
(74) *Attorney, Agent, or Firm* — Lowenstein Sandler LLP

(57) ABSTRACT

Methods and systems for conducting a transaction between a virtual USB device driver and a USB device client are provided. A hypervisor of a computer system receives one or more data packets from the client. The hypervisor stores the one or more data packets in a buffer. The hypervisor dequeues a data packet from the buffer. The hypervisor transmits the data packet to the virtual USB device driver.

19 Claims, 5 Drawing Sheets

USB REDIRECTION FOR INTERRUPT TRANSACTIONS

TECHNICAL FIELD

Embodiments of the present invention relate to a computer system, and more specifically, to a method and apparatus for implementing local and remote interrupt transactions of universal serial bus (USB) devices in a virtualized computing environment.

BACKGROUND

Universal Serial Bus (USB) is an industry standard that defines the cables, connectors and protocols used for connection, communication and power supply between computers and electronic devices. USB was designed to standardize the connection of computer peripherals, such as keyboards, pointing devices, digital cameras, printers, portable media players, disk drives and network adapters to personal computers, both to communicate and to supply electric power. It was designed not to require specific interrupt or DMA resources, and also to be 'hot-pluggable'.

A USB host controller (i.e., a USB host, e.g., in a personal computer) communicates with a USB device (e.g., a printer). USB device communication is based on pipes (logical channels). A pipe is a connection from the USB host controller to a logical entity, found on a USB device, and named an endpoint. Each USB device has one or more endpoints. Each endpoint is a source or sink of data. Data may flow OUT from the USB host to a USB device, or IN from the USB device to the USB host. USB devices talk to the USB host through four different types of USB transfers: control, bulk, isochronous, and interrupt transfers.

Isochronous transfers are data transfers at some guaranteed data rate (often, but not necessarily, as fast as possible) but with possible data loss. Error-free delivery is not guaranteed. Isochronous transfers are employed primarily in applications such as audio data streaming, where it is important to maintain the data flow, but not so important if some data is missed or corrupted. An isochronous transfer uses either an IN transaction or an OUT transaction depending on the type of endpoint. The special feature of these transactions is that there is no handshake packet at the end. Isochronous transfers occur continuously and periodically (e.g., 8000 times per second).

Interrupt transfers are data transfers for devices that need guaranteed quick responses (bounded latency). Interrupt transfers are employed to keep up to date of any changes of status in a device. Examples of their use are for a mouse or a keyboard. Traditionally, interrupt requests on microcontrollers are device generated. However, under USB, if a device requires the attention of the USB host, it should wait until the USB host polls it before it can report that it needs urgent attention. An interrupt request is queued by a USB device driver until the USB host polls the USB device asking for data.

Bulk transfers are data transfers used for large bursty data. Examples include a print-job sent to a printer or an image generated from a scanner. Bulk transfers are designed to transfer large amounts of data with error-free delivery, but with no guarantee of bandwidth.

A control transfer is a bi-directional transfer that uses both an IN and an OUT endpoint. Control transfers are typically used for command and status operations and help to set up a USB device. They are typically bursty, random packets which are initiated by the host and use best effort delivery.

Control and bulk transfers do not have critical timing constraints, but isochronous and interrupt transfers typically do. With isochronous transfers, the USB device may need to be read/written to up to 8000 times per second and failing to do so may result in data loss. Normally this is handled by the Operating Systems (OS) USB stack and USB device drivers by queuing a number of packets in a USB host controller and as soon as the transfer has been received and acknowledged (i.e. processed or completed), re-queuing packets.

Packet completion is signaled to the USB stack by a hardware interrupt, guaranteeing that the USB device driver will be acknowledged of packet completion with minimal latency. To minimize latency (e.g. in audio/video streams), the USB device driver queues the minimum number of packets needed to ensure reliable operation, based on the maximum latency of the USB stack and interrupt handling.

These timing constrains become a problem when redirecting USB traffic from a USB device through a virtual machine to a remote client machine over a network to which the USB device is physically connected. The packets first pass through the USB stack in the machine to which the USB device is physically connected before being passed to the USB stack in the virtual machine (i.e., the guest USB stack). This adds to latency, rendering assumptions about worst case latency invalid. When performing USB redirection to a remote client machine over a network, there is also a network latency component, worsening the latency problem. For a USB interrupt transaction corresponding to, for example, a user moving a USB-connected mouse at a remote client location, the user may perceive a noticeable time delay before seeing a corresponding pointer move on their terminal screen. Further, once the USB-connected mouse has a data packet to send to a device driver (virtual or real), e.g., the mouse has moved, a corresponding data packet should be processed (complete). Once an interrupt-related data packet has completed, another data packet needs to be received within a certain time. Failing to receive a new packet may lead to data loss, i.e., some mouse movement or mouse click may be lost.

Conventional remedies for the network latency problem include changing the number of packets that a virtual device driver queues. Unfortunately, this typically requires modifications to the virtual USB device driver, which is undesirable.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for conducting a transaction between a virtual USB device driver and a client USB device are described herein. In one embodiment, a virtual USB manager of a hypervisor receives one or more data packets from the client. The hypervisor stores the one or more data packets in a FIFO. The hypervisor dequeues a data packet from the FIFO. The hypervisor transmits the data packet to the virtual USB device driver. The data packet may be received by the virtual USB manager over a network from the client on another machine.

In an embodiment, the data packet may be transmitted using a USB interrupt transaction. In an embodiment, the hypervisor receives a submission of an interrupt command packet from the virtual USB device driver. In an embodiment, the client USB manager receives a command packet to initiate a transaction from the hypervisor. The client USB manager queues one or more data packets for receiving interrupts from the USB device into the USB host controller's receive queue via the USB stub driver. The client USB manager receives a completion of processing a data packet from the USB stub driver. The client USB manager dequeues one or more data packets from the queue. The client USB manager transmits the one or more data packets to the hypervisor. The client USB manager re-queues the one or more data packets into the receive queue without waiting for the virtual USB device driver to process the transmitted data packets. The client USB manager continues to receive interrupts from the USB device without waiting for the virtual USB device driver to process the one or more data packets.

In an embodiment, the queue is operable to continually have at least one data packet queued for receiving data from the USB device.

By re-queuing packets in the queue, the client USB manager resolves any problems with USB timing. By employing a FIFO, the virtual USB manager ensures that the virtual device driver receives packets even if there is some jitter in the timing of packets when packets traverse a network or within a host.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
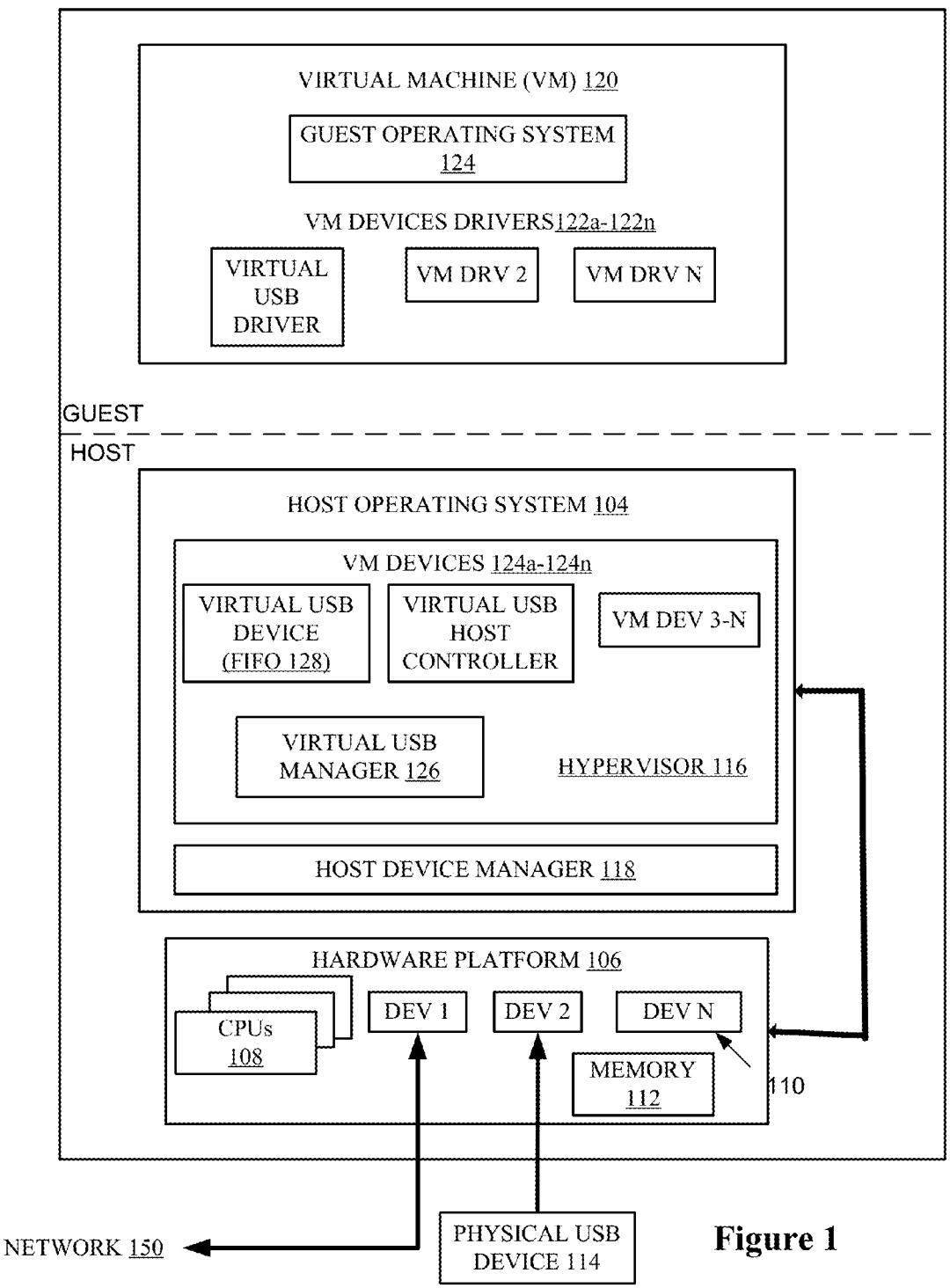
FIG. 1 is a block diagram illustrating one embodiment of a host computer system (i.e., a host) in which embodiments of the present invention may be implemented.

FIG. 1 is a block diagram illustrating one embodiment of a host computer system 100 (i.e., the host 100), in which embodiments of the present invention may be implemented. The host 100 may be a host machine such as, for example, a server computer, a gateway computer, or any other suitable computer system that is configurable for operating as a host. The host machine comprises a host operating system 104 (i.e., a host OS 104) and a hardware platform 106. Host OS 104 may include Microsoft Windows®, Linux®, Solaris®, Mac® OS or any other suitable operating system for managing operations on the host 100.

The hardware platform 106 may include one or more central processing units (CPUs) 108, devices 110, and memory 112. The devices 110 may be comprised of one or more hardware and software devices (DEV 1-DEV N), which may be located internally and externally to the host 100. An example of the devices 110 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 110 may include sound or video adaptors, photo/video cameras, printer devices, keyboards, displays, a USB host controller (e.g., device "DEV 2"), or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB device(s) 114 may be externally connectable to the host 100 via the USB host controller (e.g., DEV 2) integrated with the host 100. In an embodiment, the USB host controller may be an integrated circuit (IC) separate from the one or more CPUs 108. In another embodiment, the USB host controller may be integrated with the one or more CPUs 108.

In a virtualized environment, the host 100 is additionally configured with one or more virtual machines (VMs) 120. VM 120 is a portion of software that, when executed on appropriate hardware, creates an environment that permits the virtualization of an actual physical computer system. Each of the VMs 120 may function as a self-contained platform, comprising and running a corresponding guest operating system (OS) 124. The guest OS 124 in each of the VMs 120 may run the same or different operating systems. Similar to the host OS 104, the guest OS 124 may include Microsoft Windows®, Linux®, Solaris®, Mac® OS or any other suitable operating system for managing operations associated with a virtualization environment. A VM 120 may further comprise one or more virtual device drivers 122a-122n (i.e. VM device drivers 122a-122n) associated with one or more virtual devices 124a-124n described in more detail below.

A hypervisor 116, which emulates the underlying hardware platform 106 for the VMs 120, is provided and may run on the host OS 104. A hypervisor is also known as a virtual machine monitor (VMM), a kernel-based hypervisor or a host operating system. The hypervisor 116 may support multiple VMs 120 residing on the host 100. Alternatively, more than one hypervisor 116 (not shown) may be provided to support multiple VMs 120 residing on the host 100. A host device manager 118 manages the (real) devices 110 of the host 100. The hypervisor 116 is configured to emulate the one or more virtual devices 124a-124n in cooperation with the virtual device drivers 122a-122n residing on a virtual machine 120.

In one embodiment, one of the virtual devices 124a-124n emulated by the hypervisor 116 may be a virtual USB device 124a which is configured to communicate with a virtual USB host controller 124b in cooperation with a virtual USB manager 126. The virtual USB device 124a includes a buffer (e.g., first-in first-out (FIFO) buffer) 128 for storing USB interrupt data packets. The FIFO 128 and the virtual USB manager 126 ensure that no packet may be lost in communication with a physical USB device located on a remote client machine over the network 150.

Figure 2:
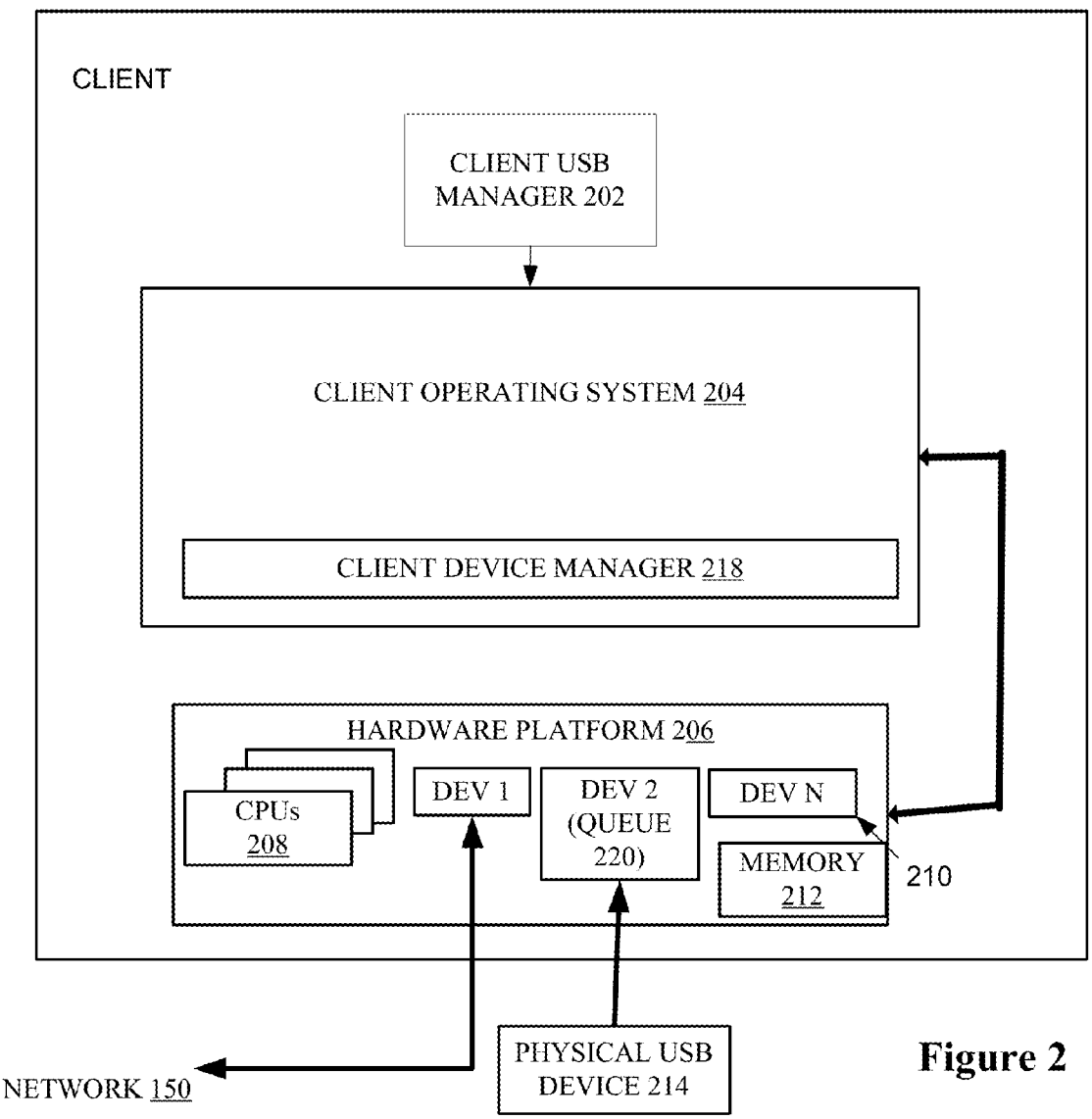
FIG. 2 is a block diagram illustrating one embodiment of one or more client computer systems (i.e., a client) configured to communicate with the host over a network, in which embodiments of the present invention may be implemented.

FIG. 2 is a block diagram illustrating one embodiment a client computer system 200 (i.e., the client 200), configured to communicate with the host 100 over the network 150, in which embodiments of the present invention may be implemented. The client 200 may include a client machine such as, for example, a server computer, a gateway computer, or any other suitable computer system that is configurable for operating as a client. The client machine comprises a client operating system 204 (i.e., a client OS 204) and a hardware platform 206. Client OS 204 may include Microsoft Windows®, Linux®, Solaris®, Mac® OS or any other suitable operating system for managing operations on the client 200.

The hardware platform 206 may include one or more central processing units (CPUs) 208, devices 210, and memory 212. The devices 210 may be comprised of one or more hardware and software devices (DEV 1-DEV N), which may be located internally and externally to the client 200. An example of the devices 210 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 210 may include sound or video adaptors, photo/video cameras, printer devices, keyboards, displays, a USB host controller (e.g., device "DEV 2"), or any other suitable device intended to be coupled to a computer system. Examples of the memory 212 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB device(s) 214 may be externally connectable to the client 200 via the USB host controller (e.g., DEV 2) integrated with the client 200. In an embodiment, the USB host controller may be an integrated circuit (IC) separate from the one or more CPUs 208. In another embodiment, the USB host controller may be integrated with the one or more CPUs 208.

In an embodiment, a USB manager application 202 (i.e., client USB manager 202) running on the client OS 204 may execute a request to read or write data to/from the USB host controller (e.g., DEV 2), the physical USB device(s) 214, and/or a network interface controller (NIC) or a network card such as an Ethernet network card (e.g., device "DEV 2") for communication over the network 150. The network 150 may be a private network (e.g., a local area network (LAN), wide area network (WAN), intranet, etc.) or a public network (e.g., the Internet).

In one embodiment, the client USB manager 202 is operable to receive a command packet to initiate a transaction from the virtual USB manager 126. The client USB manager 202 is configured to queue one or more data packets for receiving interrupts from the physical USB device 202 into the receive queue 220 of the USB host controller (e.g., DEV 2) via the client USB stub driver 306. The client USB manager 202 is configured to receive a completion of processing a data packet from the client USB stub driver 306. The client USB manager 202 is operable to dequeue one or more data packets from the receive queue 220. The client USB manager is configured to transmit the one or more data packets to the virtual USB manager 126. The client USB manager re-queues the one or more data packets into the receive queue without waiting for the virtual USB device driver to process the transmitted data packets.

The interrupt packets which are queued in the queue 220 are a reusable resource. When the client USB host controller (e.g., DEV2 of FIG. 2) has received one of the interrupt packets from the physical USB device 214, it hands the interrupt packet to the client USB manager 202, which extracts the data from received interrupt packet from the USB host controller (e.g., DEV 2), transmits the interrupt packet to the virtual USB manager 126, and queues the empty packet back into the queue 220. This last step is called "re-queuing."

Figure 3:
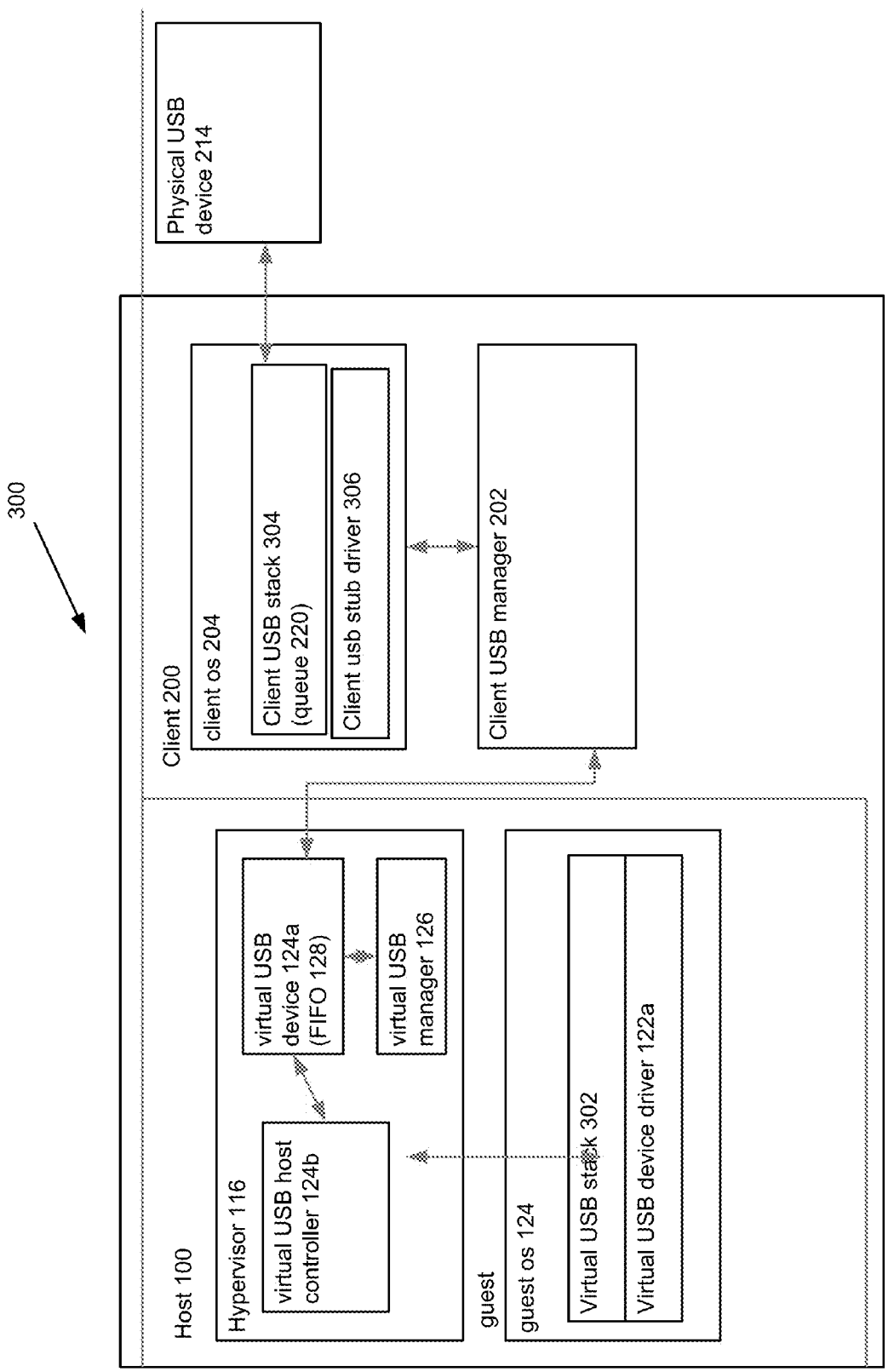
FIG. 3 is a block diagram illustrating one embodiment of a software architecture, in which embodiments may be implemented for USB data transmission between the client of FIG. 2 and the host of FIG. 1 over the network.

FIG. 3 is a block diagram illustrating one embodiment of a system architecture 300, in which embodiments of the present invention may be implemented for USB data transmission between the client 200 of FIG. 2 and the host 100 of FIG. 1 over the network 150. The host 100 is configured to emulate one or more virtual machines (i.e., the VMs 120) that include the guest OS 124 which is itself configured to include a virtual USB stack 302 for implementing the USB protocol and one or more virtual USB device driver(s) 122a for emulating the control of one or more virtual USB device(s) 124a through commands to and data received from the virtual USB device(s) 124a.

In an embodiment, the hypervisor 116 is configured to emulate the virtual USB host controller 124b and one or more virtual USB devices 124a under the control of the virtual USB manager 126 as described above corresponding to the physical USB host controller (e.g., DEV 2) and the one or more physical USB device(s) 214 externally connectable to the client 200 of FIG. 2. A client OS 204 may be configured with a client USB stack 304 for implementing the USB protocol and a client USB stub driver 306 for providing a stub API interface for receiving commands from client USB manager 202 and data from the physical USB device 214. In one embodiment, the physical USB device 214 configured as one or more USB endpoints may communicate with the client OS 204 and ultimately the virtual USB stack 302 and virtual USB device driver(s) 122a via a client USB stack 304 and a client USB stub driver 306 integrated with the client OS 204.

In an embodiment, the client 200 may also include the client USB manager 202 running on the client OS 204 working in conjunction with the virtual USB manager 126 in the hypervisor 116 of the host OS 104 to hide communication latency between the physical USB device(s) 214 associated with the client 200 and the virtual USB device(s) 124a located in the hypervisor 116 of the host 100. As with USB communication protocols, a real or virtual USB device driver initiates communications with a real or virtual USB device via a real or virtual USB host controller. In such circumstances, communication is initiated by the virtual USB device driver 122a in the guest OS 124 of the host 100 and data transferred either from virtual USB device driver 122a to the physical device(s) 214 or from the latter to the former (possibly) over the network 150 according to one of the four USB transfer types.

Diversion of USB data transfers from a physical USB device (e.g., the USB device 214) to a virtual machine (e.g., the virtual USB stack 302 and the virtual USB device driver(s) 122a) is known as "redirection." Redirection becomes more complicated and latency problems become more severe for data traffic transferred over the network 150 when a computing machine to which a physical USB device is connected (i.e., the client 200, with the host 100 acting as a server) is remotely located and separate from the host 100 on which the VM 120 is located.

For USB interrupt transactions (i.e., streams), the virtual USB device 124a in the hypervisor 116 of the host 100 may be provided with the FIFO 128. The FIFO 128 insures that no packets are lost because of timing issues. The virtual USB host controller driver 124b periodically polls (i.e., submits an interrupt command packet to) the virtual USB manager 126 for the presence of one or more data packets in the FIFO 128. If there are any data packets in the FIFO 128, the virtual USB manager 126 dequeues one or more data packets from the FIFO 128 and transmits the one or more data packet to the virtual USB device driver 122a via the virtual USB host controller 124b and the virtual USB stack 302.

In an embodiment, for interrupt transactions (i.e., streams), the client USB manager 202 is configured to receive a command packet to initiate a transaction from the virtual USB manager 126. The client USB manager 202 is configured to queue one or more data packets for receiving interrupts from the physical USB device 214 into the receive queue 220 of the USB host controller via the client USB stub driver 306. The client USB manager 202 is configured to receive a completion of processing a data packet from the client USB stub driver 306. The client USB manager 202 is configured to dequeue one or more data packets from the receive queue 220. The client USB manager 202 is configured to transmit the one or more data packets to the virtual USB manager 126. The client USB manager 202 is configured to re-queues the one or more data packets into the receive queue 202 without waiting for the virtual USB device driver 122a to process the transmitted data packets. The client USB manager is further configured to continue to receive interrupts from the physical USB device 214 without waiting for the virtual USB device driver 122a to process the data packets.

Figure 4:
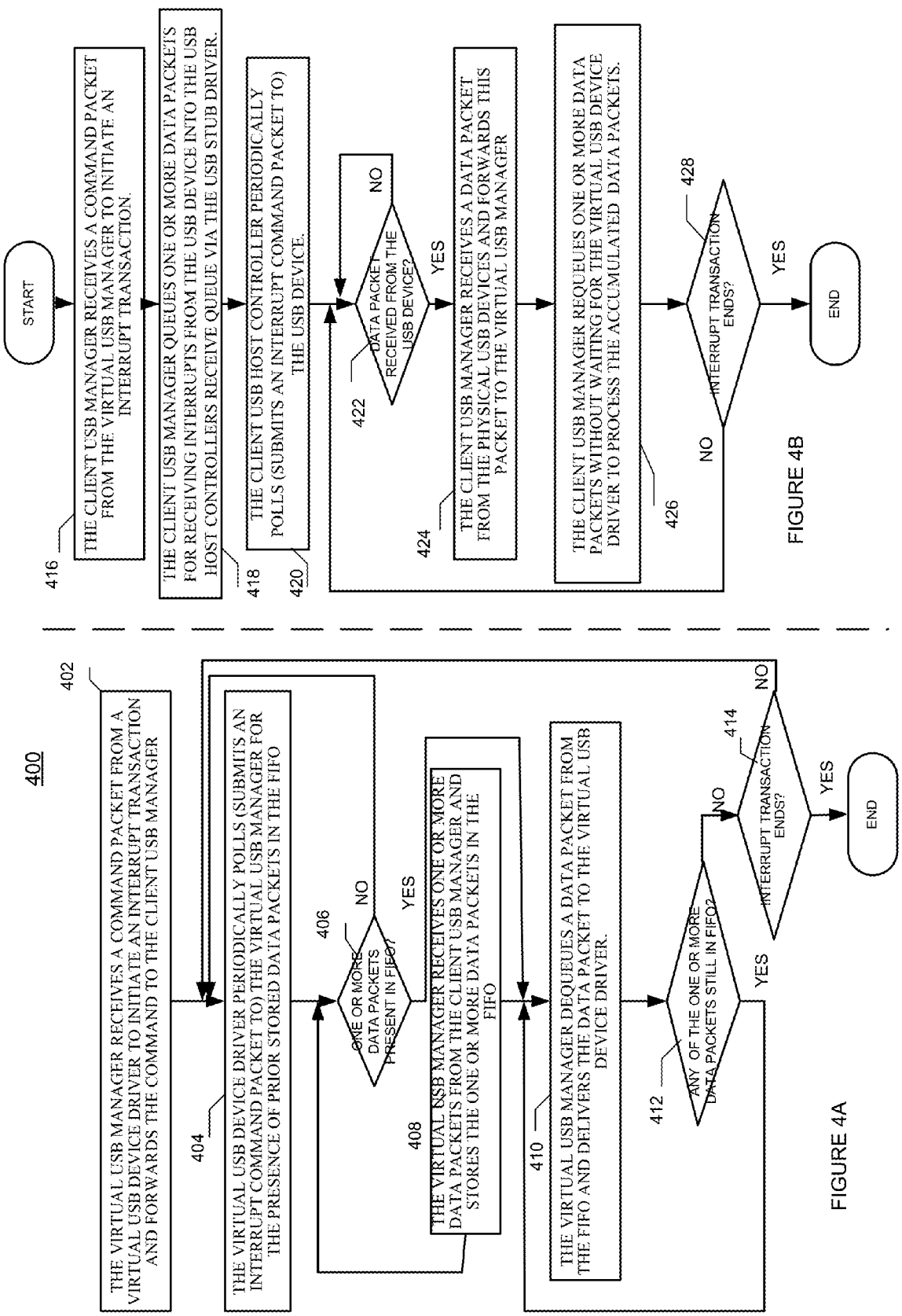
FIG. 4A is a flow diagram illustrating one embodiment of a method for conducting a hidden latency USB interrupt transaction between a guest USB device driver and a physical USB device from the point of view of the host.
FIG. 4B is a flow diagram illustrating one embodiment of a method for conducting a hidden latency USB interrupt transaction between a guest USB device driver and a physical USB device from the point of view of the client.

FIG. 4A is a flow diagram illustrating one embodiment of a method 400 for conducting a hidden latency USB isochronous interrupt between a virtual USB device driver 122 and a physical USB device (e.g. the physical USB device 214) from the point of view of the host 100. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 of FIG. 4A is performed primarily by the virtual USB manager 126 in the hypervisor 116 running in the host OS 104 of the host 100.

At block 402, the virtual USB manager 126 receives a command from the virtual USB device driver 122 via the virtual USB stack 302 to initiate interrupt transaction. The virtual USB manager 126 transmits (forwards) the command to the client USB manager 202. At block 404, the virtual USB host controller 124b periodically polls (submits an interrupt command packet to) the virtual USB manager 126, via the virtual USB device 124a, for the presence of one or more data packets. At block 406, if a data packet is not present in FIFO 128, processing returns to polling step 404 until the virtual USB manager 126 receives a one or more data packets from the client USB manager 202. At block 408, the virtual USB manager 126 receives one or more data packets from the client USB manager 202 and stores the one or more data packets in the FIFO 128.

If, at block 406, one or more data packets are present in FIFO 128 when an interrupt command packet is submitted, then at block 410, the virtual USB manager 126 dequeues a data packet from the FIFO 128 and delivers the data packet to the virtual USB device driver 122a, via the virtual USB device 124a and the virtual USB host controller 124b. At block 412, if there are still data packets in the FIFO 128, then processing returns to block 410; otherwise, at block 414, if the interrupt transaction is not finished, the processing returns to block 404 where the virtual USB manager 126 awaits another interrupt command packet. If, at block 414, the interrupt transaction is completed, then processing terminates.

FIG. 4B is a flow diagram illustrating one embodiment of the method 400 for conducting a hidden latency USB interrupt transaction between a virtual USB device driver 122 and a physical USB device (e.g., the physical USB device 214) from the point of view of the client 200. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 of FIG. 4B is performed primarily by the client USB manager 202 running on the client 200.

At block 416, the client USB manager 202 receives a command to initiate an interrupt transaction from the virtual USB manager 126. At block 418, the client USB manager 202 queues one or more data packets for receiving interrupts from the USB device 214 into the USB host controllers receive queue 220 via the USB stub driver 306. At block 420, the client USB host controller periodically polls (submits an interrupt command packet to) the physical USB device 214 At block 422, if a data packet is not received from the physical USB device 214, processing returns to polling step 422 until the client USB manager 202 receives a data packet from the physical USB device 214; otherwise, at block 424, the client USB manager 202 receives a data packet from the physical USB devices 214 and forwards this packet to the virtual USB manager 126.

At block 426, the client USB manager 202 requeues one or more data packets without waiting for the virtual USB device driver to process the accumulated data packets. At block 428, if transmission of interrupt transaction data packets has completed and has been processed, then processing terminates; otherwise, processing returns to block 422 until another interrupt command packet is submitted by the client USB manager 202.

In an embodiment, when a physical USB device 214 is connected to a remote client 200, the client USB manager 202 is configured to receive and transmit USB commands and data packets to and from the virtual USB manager 126 in the hypervisor 116 in the host 100 over the network 150. In another embodiment, when the physical device 214 is connected to the host 100 in a virtual environment as depicted in FIG. 1, the client USB manager 202 controlling the USB host controller queue 220 as well as the virtual USB manager 126 containing the FIFO 128 reside within the hypervisor 116 of the host OS 104. Further, the client OS 204 containing the client USB stack 304 and a client USB stub driver 306 are integrated with the host OS 104. USB data packets are passed between the USB device 214 and the FIFO 128 in the hypervisor 116 without an intervening network 150 as would be appreciated by one of ordinary skill in the art having the benefit of this disclosure.

In an embodiment, the client USB manager 202 configured to de-queue USB packets is further configured to resolve any problems with USB timing. The hypervisor 116 in the host 100 employs the FIFO 128 to insure that no packets for the virtual USB device driver 122 may be lost even if there is some jitter in the timing of the packets as they traverse the network 150 or between the physical USB device 214 in the client 200 and the virtual USB device driver 122 in the host 100.

Figure 5:
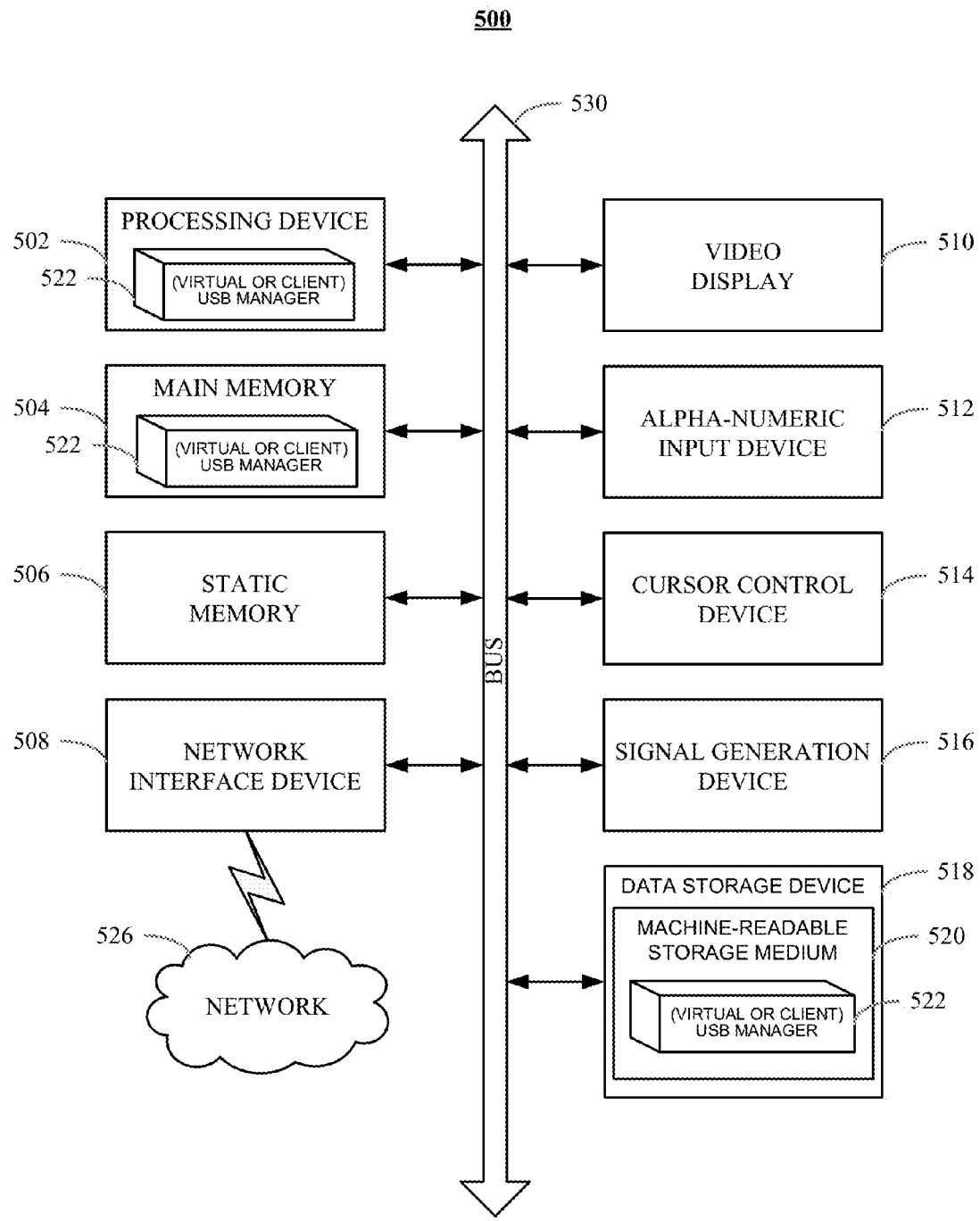
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 630.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the virtual USB manager 126 and/or the client USB manager 202 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 620 having one or more sets of instructions 622 (e.g., the virtual USB manager 126 and/or the client USB manager 202) embodying any one or more of the methodologies of functions described herein. The virtual USB manager 126 and/or the client USB manager 202 may also reside, completely or at least partially, within main memory 504 and/or within processing device 502 during execution thereof by computer system 500; main memory 504 and processing device 502 also constituting machine-readable storage media. The virtual USB manager 126 and/or the client USB manager 202 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a first processor executing a hypervisor number of data packets over a network from a universal serial bus (USB) device client application associated with a second processor;
storing the number of data packets in a buffer of the hypervisor, the number of data packets stored in the buffer of the hypervisor corresponding to an amount of jitter in the timing of packets when packets traverse the network;
periodically polling, by the first processor executing the hypervisor, a virtual USB device driver for the presence of one or more data packets in the buffer, wherein periodically polling is in view of timing of the packets;
when there is at least one data packet in the buffer, de-queuing, by the first processor executing the hypervisor, the at least one data packet from the buffer; and
transmitting the at least one data packet to the virtual USB device driver.

2. The method of claim 1, wherein the number of data packets is received and the at least one the data packet is transmitted using a USB interrupt transaction.

3. The method of claim 1, further comprising receiving, by the first processor executing the hypervisor, a command packet from the virtual USB device driver to initiate a USB interrupt transaction.

4. The method of claim 3, further comprising forwarding, by the first processor executing the hypervisor, the command packet over the network to the USB device client application associated with the second processor.

5. The method of claim 1, wherein periodically polling comprises receiving, by the first processor executing the hypervisor from the virtual USB device driver, an interrupt command packet.

6. A method comprising:
receiving, by a first processor executing a USB device client application processor over a network from a hypervisor associated with a second processor, a command packet from a virtual universal serial bus (USB) device driver to initiate a transaction;
queuing, by the first processor executing the USB device client application a number of data packets received from a USB device controller associated with a USB device into a queue of the USB device client application, the number of data packets queued into the queue of the USB device client application corresponding to an amount of jitter in the timing of packets when packets traverse the network; and
transmitting one or more data packets to over the network to the hypervisor associated with the second processor without waiting for the virtual USB device driver to process the transmitted data packets.

7. The method of claim 6, wherein the number of data packets is queued and the one or more data packets are transmitted using a USB interrupt transaction.

8. The method of claim 6, wherein the command packet is received from the hypervisor associated with the second processor to initiate a USB interrupt transaction.

9. The method of claim 6, further comprising submitting an interrupt command packet to a USB device controller.

10. The method of claim 6, wherein the queue is operable to store at least one data packet for receiving data from the USB device controller continuously.

11. A computer system, comprising:
a memory; a first processor, operatively coupled to the memory; and a hypervisor executable by the first processor: the hypervisor to:
receive a number of data packets over a network from a universal serial bus (USB) device client application associated with a second processor;
store the number of data packets in a buffer of the hypervisor, the number of data packets stored in the buffer of the hypervisor corresponding to an amount of jitter in the timing of packets when packets traverse the network;
periodically poll a virtual USB device driver for the presence data packets in the buffer, wherein periodically polling is in view of timing of the packets;
when there is at least one data packet in the buffer, dequeue the at least one data packet from the buffer; and
transmit the at least one data packet to the virtual USB device driver.

12. The computer system of claim 11, wherein the number of data packets is received and the at least one data packet is transmitted using a USB interrupt transaction.

13. The computer system of claim 11, further comprising receiving a submission of an interrupt command packet from the virtual USB device driver to initiate a USB interrupt transaction.

14. The computer system of claim 11, further comprising forwarding, by the hypervisor, the command packet over the network to the USB device client application associated with the second processor.

15. A non-transitory computer readable storage medium including comprising instructions that, cause a first processor to receive, by the first processor to execute a hypervisor, number of data packets over a network from a universal serial bus (USB) device client application associated with a second processor;
store the number of data packets in a buffer of the hypervisor, the number of data packets stored in the buffer of the hypervisor corresponding to an amount of jitter in the timing of packets when packets traverse the network;
periodically poll, by the first processor to execute the hypervisor, a virtual USB device driver for the presence of data packets in the buffer, wherein to periodically poll is in view of timing of the packets;
when there is at least one data packet in the buffer, dequeue, by the first processor to execute the hypervisor, the at least one data packet from the buffer; and
transmit the at least one data packet to the virtual USB device driver.

16. The non-transitory computer readable storage medium of claim 15, wherein the number of data packets is received and the at least one data packet is transmitted using a USB interrupt transaction.

17. The non-transitory computer readable storage medium of claim 15, further to receive, by the first processor to execute the hypervisor, a command packet from the virtual USB device driver to initiate a USB interrupt transaction.

18. The non-transitory computer readable storage medium of claim 17, further to forward, by the first processor to execute the hypervisor, the command packet over the network to the USB device client application associated with the second processor.

19. The non-transitory computer readable storage medium of claim 15, wherein to periodically poll further comprises to receive, by the first processor to execute the hypervisor from the virtual USB device driver, an interrupt command packet.

* * * * *